US012570546B2

(12) United States Patent (10) Patent No.: US 12,570,546 B2

Minato et al. (45) Date of Patent: Mar. 10, 2026

(54) CONTROL METHOD FOR ULTRAPURE WATER PRODUCING APPARATUS

(71) Applicant: KURITA WATER INDUSTRIES LTD., Tokyo (JP)

(72) Inventors: Yasuharu Minato, Tokyo (JP); Teruhisa Katou, Tokyo (JP); Kouya Abe, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 729 days.

(21) Appl. No.: 17/788,736

(22) PCT Filed: Jul. 30, 2020

(86) PCT No.: PCT/JP2020/029184

§ 371 (c)(1),
(2) Date: Jun. 23, 2022

(87) PCT Pub. No.: WO2021/131130

PCT Pub. Date: Jul. 1, 2021

(65) Prior Publication Data

US 2023/0331586 A1 Oct. 19, 2023

(30) Foreign Application Priority Data

Dec. 25, 2019 (JP) ................................. 2019-234518
Jul. 1, 2020 (JP) ................................. 2020-114072

(51) Int. Cl.
C02F 1/00 (2023.01)
B01D 61/02 (2006.01)
(Continued)

(52) U.S. Cl.
CPC ............ C02F 1/008 (2013.01); B01D 61/025 (2013.01); B01D 61/12 (2013.01); B01D 61/48 (2013.01);
(Continued)

(58) Field of Classification Search
CPC ........ C02F 1/008; C02F 1/441; C02F 1/4695; C02F 2103/04; C02F 2209/40;
(Continued)

(56) References Cited

FOREIGN PATENT DOCUMENTS

CN 108602705 9/2018
JP 2010058012 3/2010
(Continued)

OTHER PUBLICATIONS

Office Action of China Counterpart Application, with English translation thereof, issued on Jun. 30, 2023, pp. 1-15.
(Continued)

*Primary Examiner* — Terry K Cecil
(74) *Attorney, Agent, or Firm* — JCIPRNET

(57) ABSTRACT

In a primary pure water device, an electric deionization device communicated with a water supply pump is provided with a DC power supply, and desalted water from the electric deionization device can be supplied to a sub-tank. The sub-tank is provided with a level switch. In addition, while a control valve and a flow meter are provided in a flow path for the desalted water from the electric deionization device, a control valve and a flow meter are also provided in a flow path for concentrated water from the electric deionization device. The measurement data of the level switch and the flow meters can be transmitted to a control device, which can control the water supply pump and the control valves.

3 Claims, 5 Drawing Sheets

(51) Int. Cl.
　　*B01D 61/12*　　(2006.01)
　　*B01D 61/48*　　(2006.01)
　　*B01D 61/54*　　(2006.01)
　　*B01D 61/58*　　(2006.01)
　　*C02F 1/44*　　(2023.01)
　　*C02F 1/469*　　(2023.01)
　　*C02F 103/04*　　(2006.01)

(52) U.S. Cl.
　　CPC ............. *B01D 61/54* (2013.01); *B01D 61/58*
　　　(2013.01); *C02F 1/441* (2013.01); *C02F*
　　*1/4695* (2013.01); *C02F 2103/04* (2013.01);
　　　*C02F 2209/40* (2013.01); *C02F 2209/42*
　　　(2013.01)

(58) Field of Classification Search
　　CPC ........ C02F 2209/42; C02F 9/00; C02F 1/283;
　　　C02F 1/32; C02F 1/42; C02F 1/444;
　　　C02F 1/469; C02F 2209/05; C02F
　　　2301/08; B01D 61/025; B01D 61/12;
　　　B01D 61/48; B01D 61/54; B01D 61/58;
　　　B01D 61/145; B01D 61/422; B01D
　　　2311/2692; Y02A 20/131
　　See application file for complete search history.

(56) References Cited

FOREIGN PATENT DOCUMENTS

| JP | 2013000725 | 1/2013 |
| JP | 2014184380 | 10/2014 |
| JP | 2014184407 | 10/2014 |
| JP | 2014188398 | 10/2014 |
| WO | 2018235366 | 12/2018 |

OTHER PUBLICATIONS

Office Action of China Counterpart Application, with English translation thereof, issued on Dec. 19, 2023, pp. 1-15.
Baiqing Zhou, "Full-membrane water treatment technology", China Electric Power Press, Jan. 2006, pp. 281-285.
"International Search Report (Form PCT/ISA/210) of PCT/JP2020/029184," mailed on Sep. 8, 2020, with English translation thereof, pp. 1-4.
"Office Action of Japan Counterpart Application", issued on Sep. 1, 2020, with English translation thereof, p. 1-p. 7.

CONTROL METHOD FOR ULTRAPURE WATER PRODUCING APPARATUS

CROSS-REFERENCE TO RELATED APPLICATION

This application is a 371 application of the international PCT application serial no. PCT/JP2020/029184, filed on Jul. 30, 2020, which claims the priority benefit of Japan application no. 2019-234518, filed on Dec. 25, 2019, and the priority benefit of Japan application no. 2020-114072, filed on Jul. 1, 2020. The entirety of each of the above-mentioned patent applications is hereby incorporated by reference herein and made a part of this specification.

TECHNICAL FIELD

The present invention relates to a control method for an ultrapure water producing apparatus that produces ultrapure water used in the electronic industry fields such as a semiconductor field and a liquid crystal field. In particular, the present invention relates to a control method for an ultrapure water producing apparatus capable of producing primary pure water in accordance with the amount of usage in a subsystem.

BACKGROUND ART

Conventionally, ultrapure water used in the electronic industry fields such as a semiconductor field is produced by processing raw water using an ultrapure water producing apparatus composed of a preprocessing system, a primary pure water device, and a subsystem that processes the primary pure water.

For example, as illustrated in FIG. 1, an ultrapure water producing apparatus 1 is composed of a three-stage devices such as a preprocessing device 2, a primary pure water producing device 3, and a secondary pure water producing device (subsystem) 4. In the preprocessing device 2 of such an ultrapure water producing apparatus 1, the preprocessing is performed, such as by filtration of raw water W, coagulation sedimentation, and microfiltration, and suspended solids are mainly removed.

The primary pure water producing device 3 has a reverse osmosis membrane device 5 that processes preprocessed water W1, a degassing membrane device 6, an ultraviolet oxidizing device 7, an electric deionization device 9, and a water supply pump 8 that supplies water to the electric deionization device 9. The primary pure water producing device 3 removes most of the electrolytes, fine particles, viable bacteria, etc. in the preprocessed water W1 and decomposes organic substances.

The subsystem 4 is composed of a sub-tank 11 that serves as a water storage tank arranged downstream the above electric deionization device and stores primary pure water W2 produced by the primary pure water producing device 3, an ultraviolet oxidizing device 12 that processes the primary pure water W2 supplied from the sub-tank 11 via a pump (not illustrated), a non-regenerative mixed bed type ion exchange device 13, and an ultrafiltration (UF) membrane 14 as a membrane filtration device, and an RO membrane separator or the like may be further provided as required. In this subsystem 4, a small amount of organic substances (TOC components) contained in the primary pure water W2 is oxidized and decomposed by the ultraviolet oxidizing device 12 and subsequently processed by the non-regenerative mixed bed type ion exchange device 13, in which residual carbonated ions, organic acids, anionic substances, metal ions, and cationic substances are removed by ion exchange. Then, the ultrafiltration (UF) membrane 14 removes fine particles to obtain ultrapure water W3, which is supplied to a point of use 15, and unused ultrapure water is flowed back to the sub-tank 11.

In the ultrapure water producing apparatus 1 as described above, in order to stably supply the primary pure water having a predetermined water quality, control has been performed such that an excess amount of the primary pure water W2 is preliminarily produced, only the required amount is supplied to the sub-tank 11, and a surplus is circulated and used.

SUMMARY OF THE INVENTION

Problems to be Solved by the Invention

In the conventional control method for the ultrapure water producing apparatus 1 as described above, however, there is room for improvement in terms of the energy efficiency because the electric deionization device 9 or the like is supplied with more water than necessary for processing. In this regard, it is conceivable to change the processing amount in the electric deionization device 9 of the primary pure water producing device 3 in accordance with the amount of usage at the point of use 15, but there are problems in that not only it is difficult to follow the change in the amount of usage at the point of use 15, but also the water quality of the desalted water is deteriorated in the electric deionization.

The present invention provides a control method for an ultrapure water producing apparatus capable of producing primary pure water in accordance with the amount of usage in a subsystem.

Means for Solving the Problems

The present invention provides a control method for an ultrapure water producing apparatus comprising: a primary pure water system having a reverse osmosis membrane, an electric deionization device, and a water supply pump provided upstream the electric deionization device; a water storage tank arranged downstream the electric deionization device and provided with a water level measuring means; and a subsystem that further processes primary pure water produced by the primary pure water system, the control method comprising controlling an amount of water supplied to the electric deionization device so as to keep approximately constant a water level in the water storage tank measured by the water level measuring means (Invention 1).

According to the invention (Invention 1), the production amount of the primary pure water can be adjusted in accordance with the operational status of the subsystem through measuring the water level in the water storage tank arranged downstream the electric deionization device and controlling the amount of water supplied to the electric deionization device so that the water level becomes approximately constant; therefore, the running efficiency of the primary pure water system in the ultrapure water producing apparatus can be improved.

In the above invention (Invention 1), the operating current of the electric deionization device may be preferably controlled based on the amount of water supplied to the electric deionization device and a water quality of the supplied water so that a predetermined water quality of the primary pure water is achieved (Invention 2).

According to the invention (Invention 2), when the amount of water supplied to the electric deionization device is controlled, the water quality of the obtained primary pure water changes, and the primary pure water having a predetermined water quality can therefore be supplied to the sub-tank by controlling the operating current of the electric deionization device in accordance with the required water quality and amount of the primary pure water.

In the above invention (Invention 1, 2), the electric deionization device may preferably comprise: a cathode and an anode; two or more cation exchange membranes and two or more anion exchange membranes arranged between the cathode and the anode; and one or more desalting chambers and one or more concentrating chambers partitioned by the cation exchange membranes and the anion exchange membranes, the desalting chambers and the concentrating chambers may be preferably filled with an ion exchanger, the electric deionization device may preferably have a concentrated water passing means that passes concentrated water through the concentrating chambers and a means that passes supplied water through the desalting chambers and takes out desalted water, and the concentrated water passing means may preferably introduce water to be concentrated into the concentrating chambers from a side close to a desalted water outlet of the desalting chambers and drain the concentrated water from a side close to a water supply inlet of the desalting chambers (Invention 3). In particular, in the above invention (Invention 3), the concentrated water passing means may preferably introduce, as the water to be concentrated, the desalted water passed through the desalting chambers into the concentrating chambers from the side close to the desalted water outlet of the desalting chambers and drain the concentrated water from the side close to the water supply inlet of the desalting chambers (Invention 4).

According to the above inventions (Invention 3, 4), the following advantageous effects can be obtained. When the amount of water supplied to the electric deionization device is increased, the amount of processed water increases, and it is therefore necessary to increase the supply current, but this may temporarily deteriorate the water quality of the desalted water (corresponding to the primary pure water) from the electric deionization device. As a result of studies conducted by the present inventors, it has been found that when the electric deionization device as specified in Invention 3 is used, the deterioration of water quality is small. This is due to the following reasons, which will be specifically described. In an electric deionization device, when concentrated water is passed in the same direction as the water flow direction in the desalting chambers, the ion concentration of carbonate ions ($HCO_3^-$) or the like is highest on the outlet side of the concentrating chambers (outlet side of the desalting chambers), and such ions are therefore likely to accumulate in the lower part of the concentrating chambers. If, in this situation, the supply current to the electric deionization device is increased, the accumulated carbonate ions or the like will diffuse back from the concentrating chambers of the electric deionization device to the desalting chamber side to deteriorate the water quality of the desalted water. Fortunately, however, in the electric deionization device specified in Invention 3, the concentrated water is passed in the opposite direction to the water flow direction in the desalting chambers, and the ion concentration of carbonate ions or the like is thereby lowest on the inlet side of the concentrating chambers (outlet side of the desalting chambers) so that such back-diffusion is suppressed; therefore, when the flow rate of the primary pure water supplied to the subsystem is changed, the electric deionization device having such a configuration is particularly suitable. In particular, in the electric deionization device specified in Invention 4, the back-diffusion can be further suppressed because the desalted water passed through the desalting chambers is used as the water to be concentrated.

Advantageous Effect of the Invention

According to the present invention, the production amount of the primary pure water can be adjusted in accordance with the status of the subsystem through measuring the water level in the water storage tank arranged downstream the electric deionization device and controlling the amount of water supplied to the electric deionization device so that the water level becomes approximately constant; therefore, the running efficiency of the primary pure water system in the ultrapure water producing apparatus can be improved. In particular, when the amount of water supplied to the electric deionization device is controlled, the water quality of the obtained primary pure water changes, and the primary pure water having a predetermined water quality can therefore be supplied to the water storage tank by controlling the operating current of the electric deionization device in accordance with the required water quality and amount of the primary pure water.

EMBODIMENTS FOR CARRYING OUT THE INVENTION

Hereinafter, the control method for an ultrapure water producing apparatus of the present invention will be described with reference to the accompanying drawings.

First Embodiment (Ultrapure Water Producing Apparatus)

Figure 1:
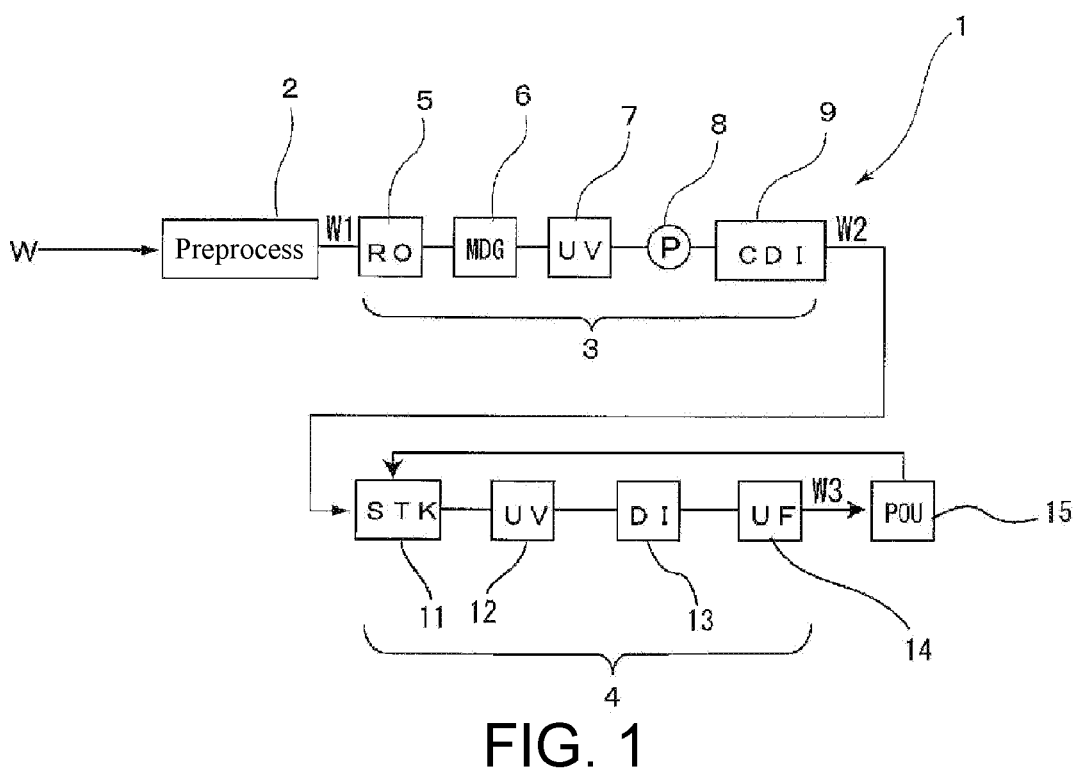
FIG. 1 is a flow diagram illustrating an ultrapure water producing apparatus to which the control method for an ultrapure water producing apparatus according to a first embodiment of the present invention can be applied.

The present invention is characterized by the control of an electric deionization device in an ultrapure water producing apparatus having a primary pure water device including such an electric deionization device. It therefore suffices that the ultrapure water producing apparatus to which the control method for an ultrapure water producing apparatus according to the present embodiment includes the electric deionization device in the primary pure water device. For example, the control method can be suitably applied to the ultrapure water producing apparatus illustrated in FIG. 1. The following description will be made based on the ultrapure water producing apparatus illustrated in FIG. 1 by denoting the same configurations with the same reference numerals.

Figure 2:
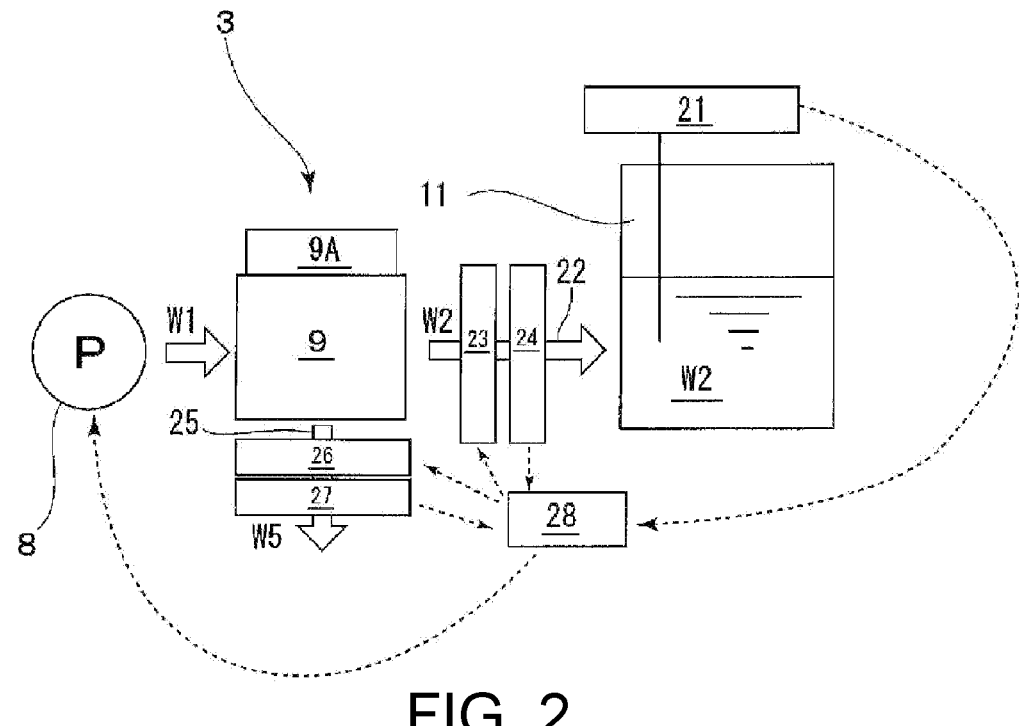
FIG. 2 is a schematic diagram illustrating a control structure of an electric deionization device in the control method for the ultrapure water producing apparatus according to the first embodiment of the present invention.

As illustrated in FIG. 2, in the primary pure water device 3 of the present embodiment, the electric deionization device 9 communicated with the water supply pump 8 is provided with a DC power supply 9A, and the desalted water W2 from the electric deionization device 9 (the desalted water W2 corresponds to the primary pure water here and hereinafter because the electric deionization device 9 is located at the end of the primary pure water device 3 in the present embodiment) can be supplied to the sub-tank 11 as a water storage tank that is arranged downstream the electric deionization device 9. The sub-tank 11 is provided with a level switch 21 as a water level measuring means. In addition, while a control valve 23 and a flow meter 24 are provided in a flow path 22 for the desalted water W2 from the electric deionization device 9, a control valve 26 and a flow meter 27 are also provided in a flow path 25 for concentrated water W5 from the electric deionization device 9. The measurement data of the level switch 21, the flow meter 24, and the flow meter 27 can be transmitted to a control device 28 including a personal computer and the like, which can independently control the water supply pump 8, the control valve 23, and the control valve 26.

Figure 3:
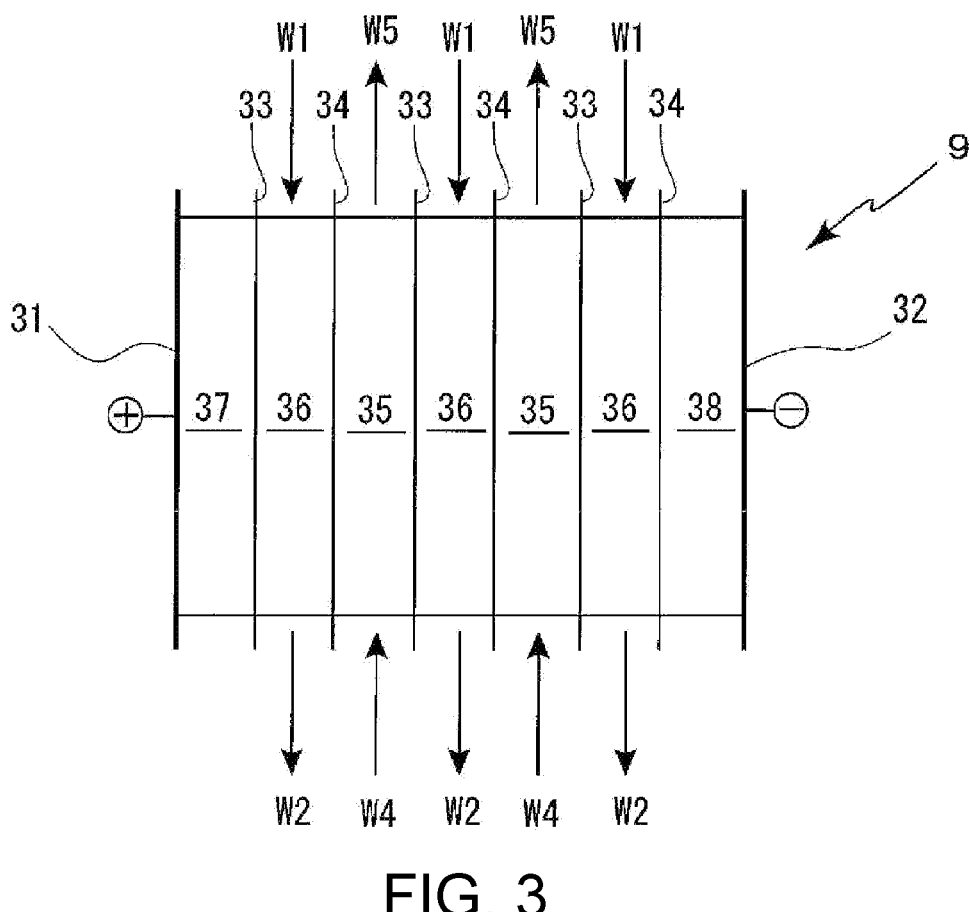
FIG. 3 is a schematic diagram illustrating the electric deionization device according to the same embodiment.
Figure 4:
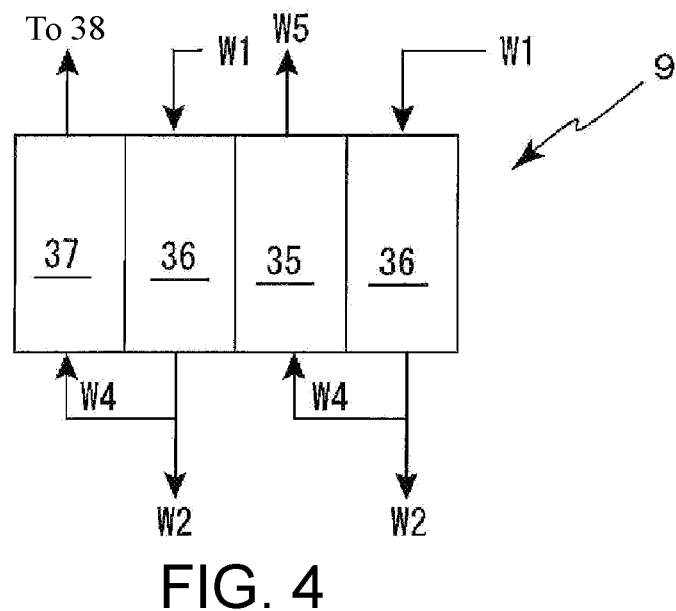
FIG. 4 is a schematic diagram illustrating a water flow state in the electric deionization device according to the same embodiment.

Here, the electric deionization device having the configuration as illustrated in FIGS. 3 and 4 can be suitably used as the electric deionization device 9.

In FIG. 3, the electric deionization device 9 is configured such that two or more anion exchange membranes 33 and two or more cation exchange membranes 34 are alternately arranged between electrodes (an anode 31 and a cathode 32) to alternately form one or more concentrating chambers 35 and one or more desalting chambers 36. The desalting chambers 36 are filled with ion exchangers (anion exchangers and cation exchangers) that are mixed or formed in a multi-layered manner. The ion exchangers are composed of ion exchange resins, ion exchange fibers, graft exchangers, or the like. Likewise, the concentrating chambers 35, an anode chamber 37, and a cathode chamber 38 are also filled with ion exchangers.

The electric deionization device 9 is provided with a water passing means (not illustrated) that passes the supplied water W1 through the desalting chambers 36 and takes out the desalted water W2 and a concentrated water passing means (not illustrated) that passes water to be concentrated W4 through the concentrating chambers 35. In the present embodiment, the water to be concentrated W4 is introduced into the concentrating chambers 35 from the side close to the outlets of the desalting chambers 36 for the desalted water W2, and the concentrated water W5 is drained from the concentrating chambers 35 close to the inlets of the desalting chambers 36 for the supplied water W1. That is, in the configuration of the present embodiment, the water to be concentrated W4 is introduced into the concentrating chambers 35 from the opposite direction to the flow direction of the supplied water W1 in the desalting chambers 36, and the concentrated water W5 is drained also in that direction. In the present specification, for descriptive purposes, the supplied water to the electric deionization device 9, which is obtained by processing the preprocessed water W1 through the reverse osmosis membrane device 5, the degassing membrane device 6, and the ultraviolet oxidizing device 7, is also described as the supplied water W1.

The supplied water W1 to the desalting chambers 36 can be used as the water to be concentrated W4 which is introduced into the concentrating chambers 35, but as illustrated in FIG. 4, it is preferred to use, as the water to be concentrated W4, the desalted water W2 obtained from the desalting chambers 36.

Figure 5:
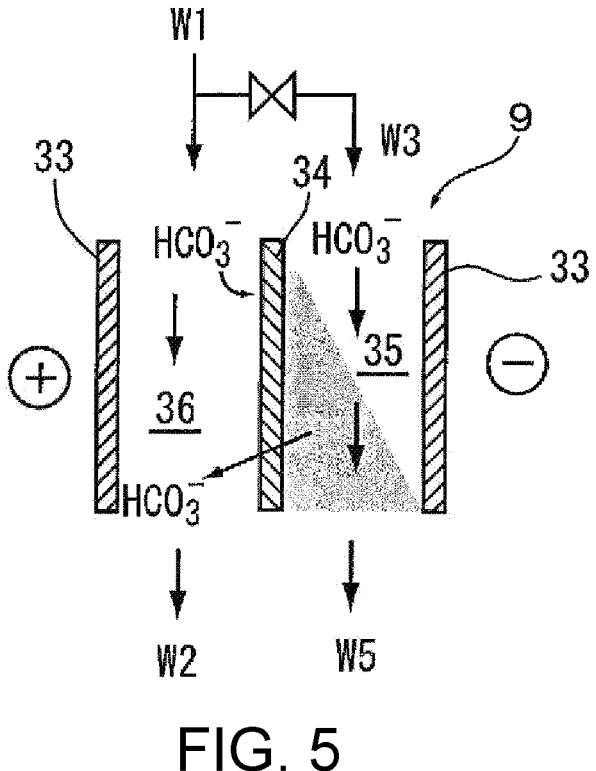
FIG. 5 is a schematic cross-sectional diagram illustrating another configuration of the electric deionization device used in the ultrapure water producing apparatus according to the same embodiment.
Figure 6:
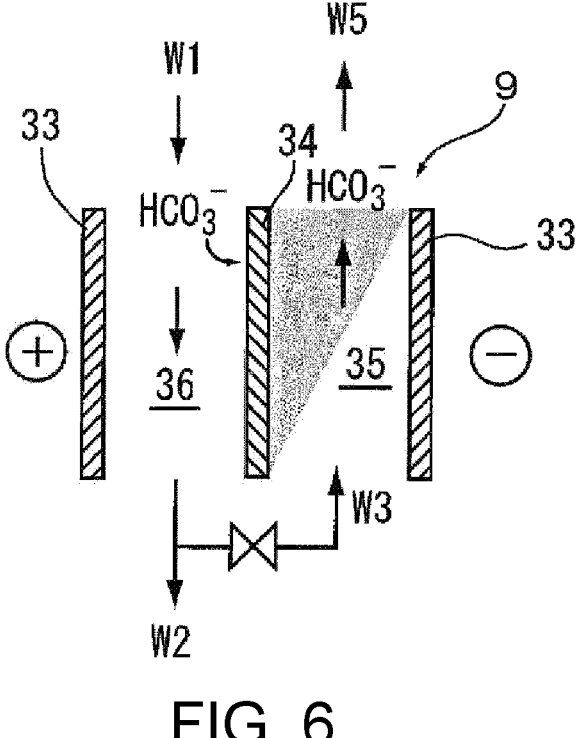
FIG. 6 is a schematic cross-sectional diagram illustrating a suitable configuration of the electric deionization device used in the ultrapure water producing apparatus according to the same embodiment.

By using such a deionization device 9, the following effects can be obtained, which will be specifically described. As schematically illustrated in FIG. 5, in the electric deionization device 9, if the water to be concentrated W4 is passed in the same direction as the water flow direction in each desalting chamber, the ion concentration of carbonate ions ($HCO_3^-$) or the like is highest on the outlet side of a concentrating chamber 35 (outlet side of a desalting chamber 36), and such ions are therefore likely to accumulate on the outlet side of the concentrating chamber 35. If, in this situation, the supply current to the electric deionization device 9 is increased, the accumulated carbonate ions or the like will diffuse back from the concentrating chamber 35 of the electric deionization device 9 to the desalting chamber 36 side and may tend to deteriorate the water quality of the desalted water. To overcome such a disadvantage, the electric deionization device 9 having a configuration as described above is used, and the ion concentration of carbonate ions or the like is thereby lowest on the inlet side of the concentrating chamber 35 (outlet side of the desalting chamber 36), so that the back-diffusion is suppressed. This can suppress the change in the water quality of the primary pure water W2 even when the amount of the desalted water is changed in the electric deionization device 9, and it can therefore be said that such a configuration is suitable when the flow rate of the primary pure water W2 supplied to the subsystem 4 is changed.

(Control Method for Ultrapure Water Producing Apparatus)

The control method for the above-described ultrapure water producing apparatus will be described below.

As illustrated in FIG. 2, the supplied water W1 is supplied to the electric deionization device 9 via the water supply pump 8. During this operation, the water level in the sub-tank 11 is measured by the level switch 21, and on the basis of this water level data, the control device 28 performs inverter control for the water supply pump 8 so as to increase the feed flow rate of the supplied water W1 to the electric deionization device 9 when the water level is lower than an approximately constant value (the water level may be within a predetermined range with respect to a predetermined reference value) while decreasing the feed flow rate when the water level is higher. Then, the control device 28 may control the control valve 23 and the control valve 26 in accordance with the amount of the supplied water W1 to control the flow rates of the desalted water (primary pure water) W2 and the concentrated water W5 in the electric deionization device 9. For example, provided that the flow rate of the concentrated water W5 is constant, the flow rate of the desalted water (primary pure water) W2 may be adjusted so that the recovery rate is changed.

Thus, by controlling the feed amount of the supplied water W to the electric deionization device 9 by the water supply pump 8 in accordance with the water level in the sub-tank 11 as a water storage tank arranged downstream the electric deionization device 9, not only the driving power for the water supply pump 8 can be reduced, but also the running efficiency of the electric deionization device 9 can be optimized, thereby reducing the amount of power required for operating the ultrapure water producing apparatus 1.

Second Embodiment (Ultrapure Water Producing Apparatus)

The second embodiment basically has the same configuration as the previously described first embodiment, so the same configuration are denoted by the same reference numerals and the detailed description thereof will be omitted.

Figure 7:
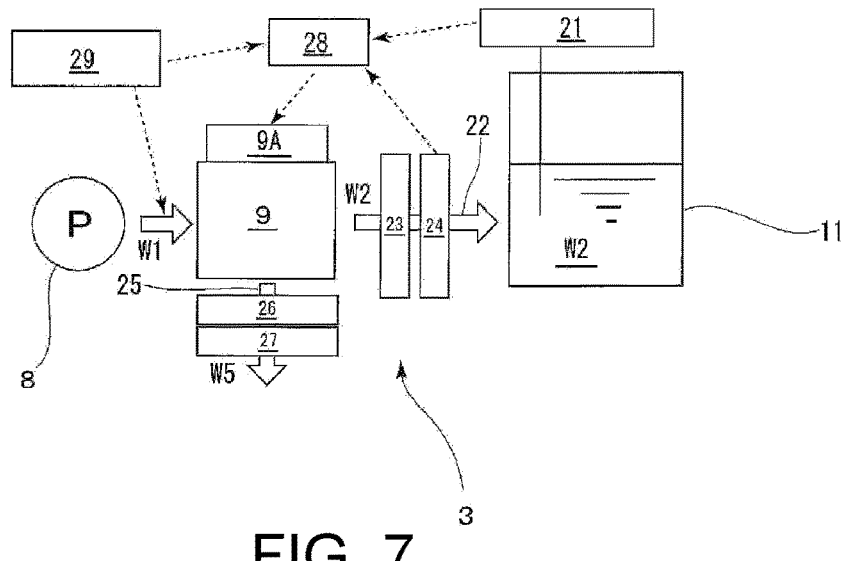
FIG. 7 is a schematic diagram illustrating a control structure of an electric deionization device in the control method for an ultrapure water producing apparatus according to a second embodiment of the present invention.

In the present embodiment, as illustrated in FIG. 7, a specific resistance meter 29 is provided as a water quality measuring means that measures the water quality of the supplied water W1. The water quality information from the specific resistance meter 29, the flow rate information of the desalted water (primary pure water) W2 from the electric deionization device 9 obtained by the flow meter 24, and the water level in the sub-tank 11 obtained by the level switch 21 can be transmitted to the control device 28, and on the basis of these information items, the amount of current supplied to the electric deionization device 9 can be controlled by the DC power supply 9A. Here, as the electric deionization device 9, the device having the configuration illustrated in FIGS. 3 and 4 can be preferably used as in the first embodiment.

(Control Method for Ultrapure Water Producing Apparatus)

The control method for the above-described ultrapure water producing apparatus will be described below.

As illustrated in FIG. 7, the supplied water W1 is supplied to the electric deionization device 9 via the water supply pump 8. During this operation, the water level in the sub-tank 11 is measured by the level switch 21, and on the basis of this water level data, the control device 28 performs inverter control for the water supply pump 8 so as to increase the feed flow rate of the supplied water W1 to the electric deionization device 9 when the water level is lower than a predetermined reference value (which may be within a predetermined range) while decreasing the feed flow rate when the water level is higher. In this operation, the supplied water W1 load (water quality×flow rate) is calculated based on the water quality information from the specific resistance meter 29 and the water supply amount from the water supply pump 8, and the control device 28 sets the operating current value of the electric deionization device 9 in accordance with the supplied water W1 load and the flow rate of the desalted water (primary pure water) W2 from the electric deionization device 9 and controls the DC power supply 9A based on the operating current value thereby to obtain the desalted water (primary pure water) W2 having a predetermined water quality. In the second embodiment, the control in the first embodiment may be combined.

Thus, by controlling the feed amount of the supplied water W to the electric deionization device 9 by the water supply pump 8 in accordance with the water level in the sub-tank 11 and controlling the amount of current supplied from the DC power supply 9A to the electric deionization device 9 in accordance with the water quality of the supplied water W1, the running efficiencies of the water supply pump 8 and the electric deionization device 9 can be optimized to reduce the amount of power required for operating the ultrapure water producing apparatus 1, and further the desalted water (primary pure water) W2 can be maintained.

In the first embodiment and the second embodiment as described above, when the water supply pump 8 cannot be controlled only by inverter control, such as when the amount of usage at the point of use 15 is small and the water level in the sub-tank 11 is too high, for example, the primary pure water device 3 may be controlled to stop. In particular, when there is a plurality of series of primary pure water devices 3, by combining the increase/decrease in the number of operating series of the primary pure water devices 3 and the control in the first embodiment or the second embodiment, more efficient operation control can be performed.

The present invention has been described above with reference to each of the above embodiments, but the present invention is not limited to the above embodiments, and various modifications can be carried out. For example, the present invention can be applied to various configurations of the ultrapure water producing apparatus 1, provided that the primary pure water device 3 includes an electric deionization device. The electric deionization device 9 may be of a type having the desalted water and the concentrated water in the same direction. In each of the above embodiments, the sub-tank 11 is used as a water storage tank arranged downstream the electric deionization device 9, but when the water storage tank is located downward the electric deionization device 9, the water level can be measured in the same manner for the control.

EXAMPLES

Hereinafter, the present invention will be more specifically described with reference to examples, but the present invention is not limited to the following examples.

Example 1

Figure 8:
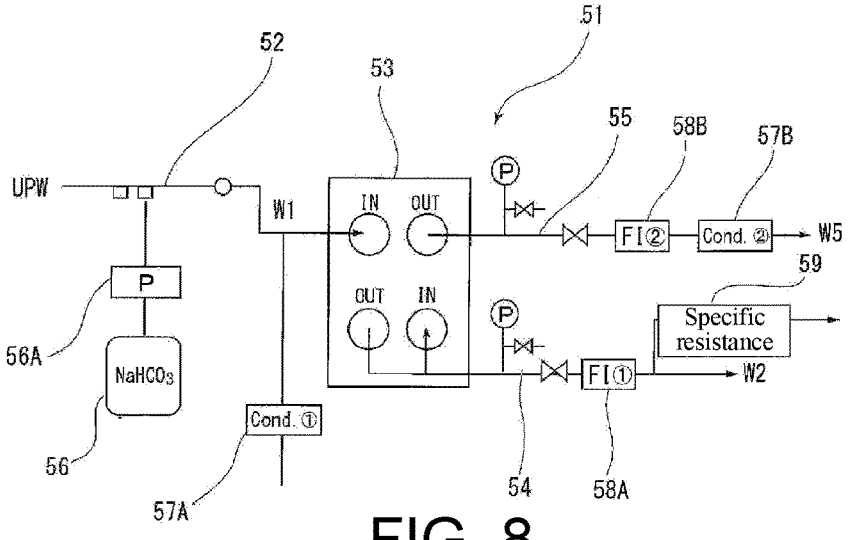
FIG. 8 is a schematic diagram illustrating a control structure of the electric deionization device in Example 1.

(Behavior Confirmation Test of Desalted Water Quality with Respect to Current Value Change)
Testing Device A testing device for controlling an electric deionization device illustrated in FIG. 8 was prepared. This testing device 51 has an ultrapure water (UPW) flow path 52, an electric deionization device 53, a desalted water (primary pure water) flow path 54, and a concentrated water flow path 55. A sodium carbonate solution tank 56, which is a source of carbonate ions ($HCO_3^-$), is connected to the ultrapure water (UPW) flow path 52 via a chemical solution pump 56A, and a conductivity meter 57A is provided. A flow meter 58A is provided in the desalted water flow path 54, to which a resistivity meter 59 is connected. A flow meter 58B is provided in the concentrated water flow path 55, to which a conductivity meter 57B is connected. The electric deionization device having the configuration illustrated in FIGS. 3 and 4 was adopted as the electric deionization device 53.

In the testing device as described above, the supplied water W1 was obtained by adding a sodium carbonate solution from the sodium carbonate solution tank 56 to ultrapure water (UPW) so that the carbonic acid concentration became 1 mg/L, and the supplied water W1 was processed by the electric deionization device 53 so that the recovery rate would be 80% (desalted water W2: 5.0 L/min, concentrated water W5: 1.2 L/min). In this operation, the amount of current supplied to the electric deionization device 53 was sequentially changed in the order of 0.1 A, 0.2 A, 0.4 A, 1 A, 2 A, and 4 A every 100 to 200 hours, and the electric deionization device 53 was finally continuously operated at 4A. At that time, changes with time of the specific resistance value of the desalted water W2 and the electric conductivity of the concentrated water W5 were measured. The results are listed in Table 1 together with the electric conductivity of the supplied water W1.

TABLE 1

| Operating current | Electric conductivity of supplied water (mS/m) | Specific resistance value of desalted water (MΩ · cm) | Electric conductivity of concentrated water (mS/m) [Initial value → Stable value] |
|---|---|---|---|
| 0.1 A | about 0.16 | about 13 to 14 | 2.0→1.4 |
| 0.2 A | about 0.16 | about 17.6 to 17.8 | 2.8→1.7 |
| 0.4 A | about 0.16 | about 18 | 3.7→1.7 |
| 1 A | about 0.16 | about 18 | 5.0→2.2 |
| 2 A | about 0.16 | about 18 | 6.0→1.8 |
| 4 A | about 0.16 | about 18 | 5.4→1.8→0.9 |

As is apparent from Table 1, it is found that the water quality (electric conductivity) of the supplied water W1 is almost constant (about 0.16 mS/m), and not only the water quality is improved as the current value increases, but also the stable water quality of about 18 MΩ·cm can be maintained even when the current value is changed, provided that the operating current is 0.4 A or more. On the other hand, in the concentrated water, the water quality deteriorated rapidly (electric conductivity increased) when the current value was increased, and the electric conductivity tended to increase as the operating current is increased. This appears to be because the amount of radicals generated due to the split of water increases as the current value increases, and the amount of carbonate ions ($HCO_3^-$) drained from the concentrating chambers increases. It has been recognized that when the operation is continued at a current value of 4 A, the electric conductivity of the concentrated water finally tends to converge to 0.8 mS/m, which is a five-fold concentration value of the supplied water W1.

Example 2

(Behavior Confirmation Test of Desalted Water Quality with Respect to Change in Water Flow Rate of Supplied Water)

Testing Device

Figure 9:
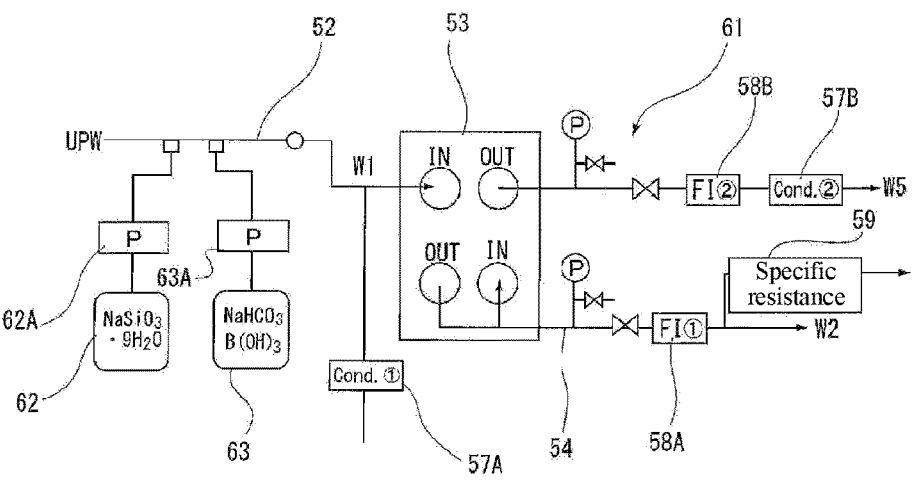
FIG. 9 is a schematic diagram illustrating a control structure of the electric deionization device in Examples 2 and 3.

A testing device for controlling the electric deionization device illustrated in FIG. 9 was prepared. This testing device 61 has a configuration like the device illustrated in FIG. 8, but in this configuration, as substitute for the sodium carbonate solution tank 56 and the chemical solution pump 56A, a sodium silicate ($NaSiO_3$) solution tank 62 as a silica ($SiO_2$) source is connected to the ultrapure water flow path 52 via a chemical solution pump 62A, and a mixed solution tank 63 of boron hydroxide ($B(OH)_3$) as a boron source and sodium carbonate is connected to the ultrapure water flow path 52 via a chemical solution pump 63A.

Supplied Water W1

The supplied water W1 was obtained by adding, to the ultrapure water (UPW), the sodium silicate solution and the mixed solution of boron hydroxide and sodium carbonate from the sodium silicate solution tank 62 and the mixed solution tank 63 so that the silica concentration, the boron concentration, and the carbonic acid concentration would be 1000 µg/L, 100 µg/L, and 10 mg/L, respectively.

Using the testing device and supplied water W1 as described above, the electric deionization device was continuously operated under the following three conditions.

Operating Condition 1

The electric deionization device 53 was supplied with the supplied water W1 at a water flow rate of 0.3 m³/h and operated for about 20 hours with a current value of 4.0 A and a recovery rate of 80%. The silica concentration of the desalted water (desalted water W2) from the electric deionization device 53 was 1.2 µg/L and the boron concentration was 0.13 µg/L, both of which indicated a high removal rate of 99.8% or more.

Operating Condition 2

Subsequently, the electric deionization device 53 was supplied with the supplied water W1 at a water flow rate of 0.24 m³/h and operated for about 20 hours with a current value of 4.0 A and a recovery rate of 80%. The silica concentration of the desalted water (desalted water W2) from the electric deionization device 53 was 0.79 µg/L and the boron concentration was 0.11 µg/L, both of which indicated a high removal rate of 99.9% or more.

Operating Condition 3

The electric deionization device 53 was further operated for about 20 hours under the same condition as the operating condition 1. The silica concentration of the desalted water (desalted water W2) from the electric deionization device 53 was 1.6 µg/L and the boron concentration was 0.15 µg/L, both of which indicated a high removal rate of about 99.8% or more.

The changes over time in the specific resistance value of the desalted water W2 and the electric conductivity of the concentrated water W5 during the operations under these operating conditions 1 to 3 were measured. The results are illustrated in FIG. 10 together with the electric conductivity of the supplied water W1.

Figures 10, 11:
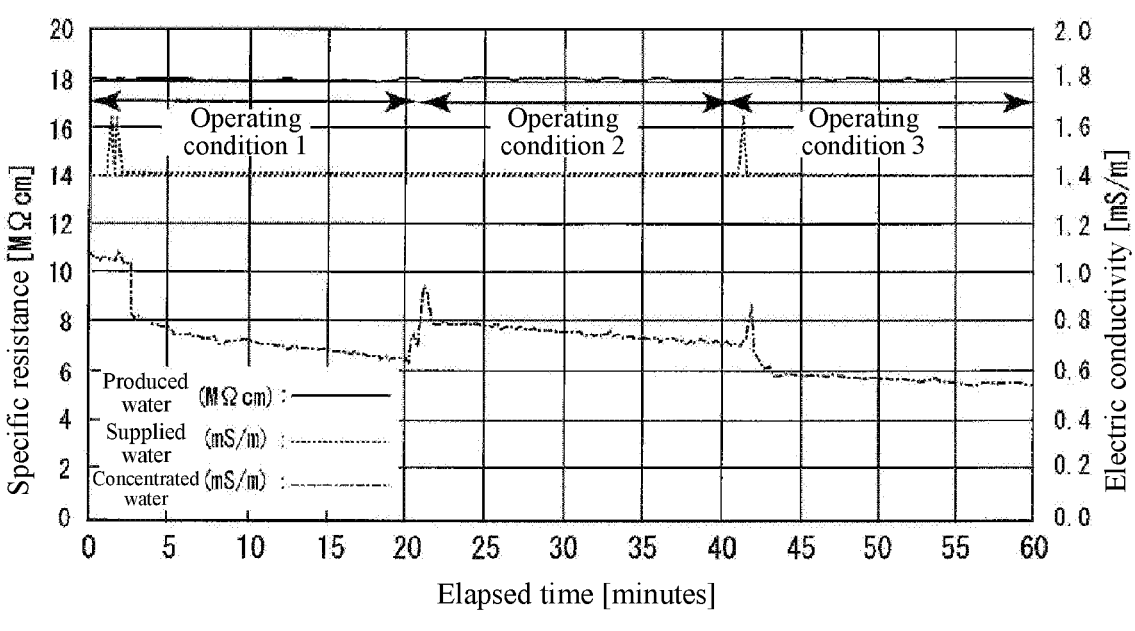
FIG. 10 is a graph illustrating a change in the water flow rate of the electric deionization device in Example 2 and a situation of change in the water quality.
FIG. 11 is a graph illustrating a change in the water supply load of the electric deionization device in Example 3 and a situation of change in the water quality.

As is apparent from FIG. 10, it can be found that the electric conductivity of the concentrated water changes by changing the amount of the supplied water W1, but the desalted water W2 can maintain a stable specific resistance value of about 18 MΩ·cm.

Example 3

(Behavior Confirmation Test of Desalted Water Quality with Respect to Change in Water Supply Load)

The following test was performed using the same testing device as in Example 2.

Supplied Water W1

The supplied water W1 was obtained as the original water (1 time concentration) by adding, to the ultrapure water, the sodium silicate solution and the mixed solution of boron hydroxide and sodium carbonate from the sodium silicate solution tank 62 and the mixed solution tank 63 so that the silica concentration, the boron concentration, and the carbonic acid concentration would be 1000 µg/L, 100 µg/L, and 10 mg/L, respectively.

Using the above-described testing device and supplied water W1, the electric deionization device was continuously operated under the following three conditions.

Operating Condition 1

The electric deionization device 53 was supplied with the supplied water W1 at a water flow rate of 0.3 m³/h and operated for about 20 hours with a current value of 4.0 A and a recovery rate of 80%. The silica concentration of the desalted water (desalted water W2) from the electric deionization device 53 was 1.6 µg/L and the boron concentration was 0.15 µg/L, both of which indicated a high removal rate of 99.8% or more.

Operating Condition 2

Subsequently, the supplied water W1 was diluted 20 times (0.05 times the concentration) and the electric deionization device 53 was supplied with the diluted supplied water W1 at a water flow rate of 0.3 m³/h and operated for about 20 hours with a current value of 4.0 A and a recovery rate of 80%. The silica concentration of the desalted water (desalted water W2) from the electric deionization device 53 was 0.38 µg/L and the boron concentration was 0.12 µg/L, both of which indicated a high removal rate of 99.9% or more.

Operating Condition 3

The electric deionization device 53 was further operated for about 20 hours under the same condition as the operating condition 1. The silica concentration of the desalted water (desalted water W2) from the electric deionization device 53 was 1.8 µg/L and the boron concentration was 0.17 µg/L, both of which indicated a high removal rate of about 99.8% or more.

The changes over time in the specific resistance value of the desalted water W2 and the electric conductivity of the concentrated water W5 during the operations under these operating conditions 1 to 3 were measured. The results are illustrated in FIG. 11 together with the electric conductivity of the supplied water W1.

As is apparent from FIG. 11, it can be found that the electric conductivity of the concentrated water changes by changing the ion concentration of the supplied water, but the desalted water W2 can maintain a stable specific resistance value of about 18 MΩ·cm.

From Examples 1 to 3, it can be found that according to the control method for an ultrapure water producing apparatus of the present invention, even when the amount of water supplied to the electric deionization apparatus, the water quality of the supplied water, the operating current value, etc. are changed, the desalted water (primary pure water) can be supplied with a stable water quality.

DESCRIPTION OF REFERENCE NUMERALS

1 Ultrapure water producing apparatus
2 Preprocessing device
3 Primary pure water producing device
4 Secondary pure water producing device (subsystem)
5 Reverse osmosis membrane device
6 Degassing membrane device
7 Ultraviolet oxidizing device
8 Water supply pump
9 Electric deionization device
9A DC power supply
11 Sub-tank
12 Ultraviolet oxidizing device
13 Non-regenerative mixed bed type ion exchange device
14 Ultrafiltration (UF) membrane
15 Point of use
21 Level switch (water level measuring means)
29 Specific resistance meter (water quality measuring means)

31 Anode (electrode)
32 Cathode (electrode)
33 Anion exchange membrane
34 Cation exchange membrane
35 Concentrating chamber
36 Desalting chamber
W Raw water
W1 Preprocessed water (supplied water)
W2 Primary pure water (desalted water)
W3 Ultrapure water (secondary pure water)
W4 Water to be concentrated
W5 Concentrated water

The invention claimed is:

1. A control method for an ultrapure water producing apparatus, the ultrapure water producing apparatus comprising:
a primary pure water system having a reverse osmosis membrane, an electric deionization device, and a water supply pump provided upstream the electric deionization device;
a water storage tank arranged downstream the electric deionization device and provided with a water level measuring means; and
a subsystem that further processes primary pure water produced by the primary pure water system, and
the control method comprising
controlling an amount of supplied water being supplied to the electric deionization device so as to keep a constant water level in the water storage tank measured by the water level measuring means,
calculating a load of the supplied water based on the amount of the supplied water and a specific resistance of the supplied water, and
setting an operating current value of the electric deionization device in accordance with the load of the supplied water and a flow rate of the primary pure water.

2. The control method for an ultrapure water producing apparatus according to claim 1,
wherein the electric deionization device comprises:
a cathode and an anode;
two or more cation exchange membranes and two or more anion exchange membranes arranged between the cathode and the anode; and
one or more desalting chambers and one or more concentrating chambers partitioned by the cation exchange membranes and the anion exchange membranes,
wherein the desalting chambers and the concentrating chambers are filled with an ion exchanger,
wherein in the electric deionization device,
water to be concentrated is introduced into the concentrating chambers from a side close to a desalted water outlet of the desalting chambers, and concentrated water is drained from a side close to a water supply inlet of the desalting chambers, and
the supplied water is introduced into the desalting chambers, and desalted water is taken out from the desalting chambers.

3. The control method for an ultrapure water producing apparatus according to claim 2, wherein the desalted water is introduced into the concentrating chambers from the side close to the desalted water outlet of the desalting chambers as the water to be concentrated.

* * * * *